May 26, 1931. D. PINNELLI 1,807,009
CONVERTIBLE IMPLEMENT
Filed June 7, 1930
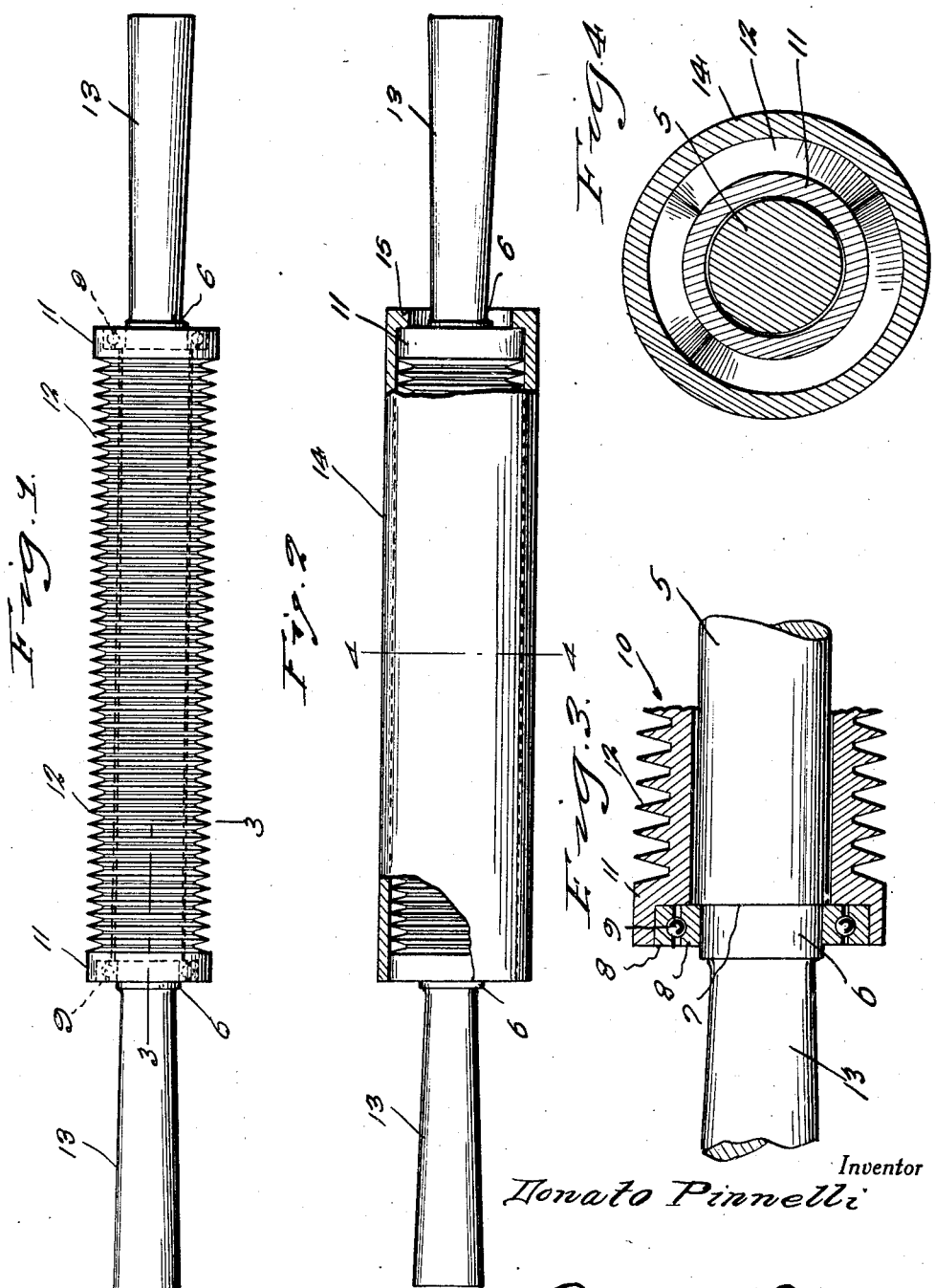
Inventor
Donato Pinnelli
By Clarence A. O'Brien
Attorney Patented May 26, 1931

1,807,009

UNITED STATES PATENT OFFICE

DONATO PINNELLI, OF ORANGE, NEW JERSEY

CONVERTIBLE IMPLEMENT

Application filed June 7, 1930. Serial No. 459,783.

This invention relates to new and useful improvements in domestic implements, and more particularly to a novel macaroni cutter which is capable of being converted into a rolling pin.

An important object of the invention is to provide a macaroni cutter for cutting macaroni into strips of triangular cross section.

Another important object of the invention is to provide a macaroni cutter capable of being readily converted into a rolling pin.

Still another object of the invention is to provide a domestic implement of the character described, of ball bearing construction.

These and numerous other important objects and advantages of the invention will more readily become apparent to the reader as the specification proceeds hereinafter.

In the drawings:—

Figure 1 represents a side elevational view of the novel macaroni cutter.

Fig. 2 represents a side elevational view of the implement converted into a rolling pin, the same being partly broken away to disclose the macaroni cutter therein.

Fig. 3 is a fragmentary longitudinal sectional view taken substantially on the line 3—3 of Fig. 1.

Fig. 4 represents a cross sectional view, taken substantially on the line 4—4 of Fig. 2.

Referring to the drawings wherein like numerals designate like parts, it can be seen that the novel implement includes a shaft 5 having a reduction 6 at each end thereof, so as to provide a shoulder 7. On each of the reductions 6 a pair of concentric rings 8—8 are located between these rings, and have interposed, the balls 9.

The innermost ring 8 abuts the shoulder 7, while the outermost ring is preferably secured to the macaroni cutter generally referred to by numeral 10. This macaroni cutter comprises an elongated hollow cylinder 11 provided with circumferentially extending ribs 12 at equal longitudinally spaced intervals. Each of these ribs is of V-shape in cross section, so as to provide V-shaped grooves therebetween.

Each end of the cylinder 11 is counter-bored to receive the outermost ring 8 of the ball bearing mount. It can be seen in Fig. 3, that by means of these ball bearing mounts, the cylinder 11 is actually spaced from the shaft 5. At each end of the shaft 5, a handle 13 is provided, and obviously in the use of the macaroni cutter, the handles 13 are held firmly in the hand, and not allowed to rotate as in the use of the ordinary macaroni cutters now on the market.

In order to convert this novel macaroni cutter into a rolling pin for rolling dough, a sleeve 14 is provided, which sleeve is open at its opposite end and as noted in Fig. 2, is provided with an inwardly extending flange 15 at one end thereof to abut the corresponding end of the cylinder 11.

Thus, when the sleeve 14 is positioned on the macaroni cutter in the manner shown in Fig. 2, the same has all the resemblance of a rolling pin. Yet in the use of the rolling pin, the same independent action is acquired between the sleeve 14 and the handles 13 as between the cylinder 11 and the handle 13.

It can thus be seen that by the use of this novel implement, the handle 13 may be firmly grasped, at the same time permitting the macaroni to be cut, or the dough to be rolled in a far more satisfactory and efficient manner than by the use of devices heretofore generally used.

Obviously, certain changes in the shape, size, materials may be resorted to without departing from the spirit and scope of the invention as claimed hereinafter.

Having thus described my invention, what I claim as new is:—

1. A device of the character described comprising an elongated cylinder having at each end a reduced straight cylindrical portion from which axially extends a handle, a pair of concentric rings placed one outside of the other on said reduced portions and confining ball bearings therebetween providing for relative rotation of the outer ring over the inner ring, a sleeve formed with peripheral cutting ribs and having enlarged counter-bores at the ends thereof constituting recesses adapted to snugly receive the outer rings, the interior of said sleeve being spaced from the cylinder to provide for free relative rotation of the sleeve over the said cylinder, and a removable roller attachment for disposition over said sleeve comprising a hollow cylinder having an interior flange at one end for abutting one end of the sleeve when the attachment is in place.

2. A device of the character described comprising an elongated cylinder having at each end a reduced straight cylindrical portion from which axially extends a handle, a pair of concentric rings placed one outside of the other on said reduced portion and confining ball bearings therebetween providing for relative rotation of the outer ring over the inner ring, a sleeve formed with peripheral cutting ribs and having enlarged counter-bores at the ends thereof constituting recesses adapted to snugly receive the outer rings, the interior of said sleeve being spaced from the cylinder to provide for free relative rotation of the sleeve over the said cylinder, and a removable roller attachment for disposition over said sleeve comprising a hollow cylinder having an interior flange at one end for abutting one end of the sleeve when the attachment is in place, the cutting ribs of said sleeve being formed continuously intermediate the ends of the sleeve and terminating inwardly of said ends, resulting in a smooth bearing surface at each end of the sleeve.

In testimony whereof I affix my signature.

DONATO PINNELLI.